(12) United States Patent
Ota et al.

(10) Patent No.: US 12,153,172 B2
(45) Date of Patent: Nov. 26, 2024

(54) RADIATION DETECTOR AND RADIATION DETECTION DEVICE

(71) Applicant: HAMAMATSU PHOTONICS K.K., Hamamatsu (JP)

(72) Inventors: Ryosuke Ota, Hamamatsu (JP); Soh Uenoyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 17 days.

(21) Appl. No.: 17/747,107

(22) Filed: May 18, 2022

(65) Prior Publication Data

US 2022/0381927 A1 Dec. 1, 2022

(30) Foreign Application Priority Data

May 31, 2021 (JP) ................................. 2021-091678

(51) Int. Cl.
*G01T 1/20* (2006.01)

(52) U.S. Cl.
CPC .......... *G01T 1/2002* (2013.01); *G01T 1/2018* (2013.01)

(58) Field of Classification Search
None
See application file for complete search history.

(56) References Cited

U.S. PATENT DOCUMENTS

| 7,138,633 B1 | 11/2006 | Rozsa et al. | |
| 2001/0008287 A1* | 7/2001 | Kraiczek | G01J 1/429 |
| | | | 257/186 |
| 2006/0011854 A1* | 1/2006 | Katagiri | G01T 1/202 |
| | | | 250/390.11 |
| 2009/0109516 A1* | 4/2009 | Wang | H10N 70/826 |
| | | | 359/290 |
| 2013/0170018 A1* | 7/2013 | Domash | G02B 26/007 |
| | | | 359/320 |
| 2015/0001398 A1* | 1/2015 | Ronda | G01T 1/2002 |
| | | | 250/363.04 |

FOREIGN PATENT DOCUMENTS

| CN | 111081728 A | 4/2020 |
| JP | H10-274675 A | 10/1998 |
| JP | 2005-300479 A | 10/2005 |
| JP | 2011-530000 A | 12/2011 |

(Continued)

OTHER PUBLICATIONS

Pots, Rosalinde Hendrika et al., "Improving light output and coincidence time resolution of scintillating crystals using nanoimprinted photonic crystal slabs," Nuclear Inst. and Methods in Physics Research, A, 940 (2019), pp. 254-261.

*Primary Examiner* — Edwin C Gunberg
(74) *Attorney, Agent, or Firm* — Faegre Drinker Biddle & Reath LLP

(57) ABSTRACT

A radiation detector of one embodiment includes: a scintillator configured to generate first scintillation light having a first peak wavelength and second scintillation light having a second peak wavelength in response to radiation incidence; a photodetection unit configured to detect the scintillation light generated by the scintillator; and a filter layer disposed between the scintillator and the photodetection unit and configured to selectively block the first scintillation light. The filter layer has a metasurface structure.

12 Claims, 13 Drawing Sheets

(56) References Cited

FOREIGN PATENT DOCUMENTS

| | | |
|---|---|---|
| JP | 2013-522815 A | 6/2013 |
| JP | 2013-174474 A | 9/2013 |
| JP | 2017-529408 A | 10/2017 |
| JP | 2019-191047 A | 10/2019 |
| WO | WO-2010/015955 A2 | 2/2010 |
| WO | WO-2011/113208 A1 | 9/2011 |
| WO | WO-2015/197947 A1 | 12/2015 |

* cited by examiner

RADIATION DETECTOR AND RADIATION DETECTION DEVICE

TECHNICAL FIELD

The present disclosure relates to a radiation detector and a radiation detection device.

REFERENCE TO THE RELATED APPLICATION

This application claims the benefit of priority from Japanese Patent Application No. 2021-091678 filed on May 31, 2021, the entire contents of which are incorporated herein by reference.

BACKGROUND

A radiation detector having a scintillator that converts radiation such as X-rays into light and a photodetector that detects the light converted by the scintillator is known. Patent Literature 1 (Chinese Patent Application Publication No. 111081728) discloses a configuration in which a light selection layer is disposed between a CsI-based scintillator and a TFT substrate that is a photodetector in such a radiation detector. In this configuration, the afterglow component of scintillation light (fluorescence) generated by the scintillator is absorbed or reflected by the light selection layer, and the afterglow component detected on the TFT substrate is reduced as a result.

In the configuration disclosed in Patent Literature 1, a resin film (one of a PVC film, a PET film, and a PE film or a combination of two or more of the films) is adopted as the light selection layer. However, when the resin film is used as the light selection layer, it is relatively difficult to adjust light in an ultraviolet region (wavelength region of 300 nm or less in particular) so as to selectively transmit (or absorb or reflect) the light. In addition, when there are two emission peaks and one peak wavelength is longer than the other, it is difficult to selectively transmit the former with the resin film.

SUMMARY

One aspect of the present disclosure is to provide a radiation detector and a radiation detection device capable of suitably detecting light having a wavelength of interest regardless of the wavelength region of the scintillation light and the shape of the emission peak.

A radiation detector according to one aspect of the present disclosure includes: a scintillator configured to generate first scintillation light having a first peak wavelength and second scintillation light having a second peak wavelength in response to radiation incidence; a photodetection unit configured to detect the scintillation light generated by the scintillator; and a filter layer disposed between the scintillator and the photodetection unit and configured to selectively block the first scintillation light, in which the filter layer has a metasurface structure.

In the radiation detector described above, the scintillator generates the first scintillation light and the second scintillation light having different peak wavelengths. The filter layer disposed between the scintillator and the photodetection unit selectively blocks the first scintillation light having the first peak wavelength. In other words, the second scintillation light having the second peak wavelength is selectively transmitted to the photodetection unit. Here, the filter layer is configured by a metasurface structure instead of a resin film. By configuring the filter layer with the metasurface structure, the following advantages can be obtained as compared with when the filter layer is configured by a resin film. That is, by controlling the shape of the metasurface structure, better filter performance than when the filter layer is configured by a resin film can be obtained regardless of the wavelength region of the scintillation light and the shape of the emission peak (resonance peak width or the like). In other words, light having a wavelength of interest (here, the second scintillation light having the second peak wavelength) can be suitably transmitted, and light having a wavelength other than the wavelength of interest (here, the first scintillation light having the first peak wavelength) can be suitably blocked. Accordingly, with the radiation detector, light having a wavelength of interest can be suitably detected regardless of the wavelength region of the scintillation light and the shape of the emission peak.

The filter layer may be a plasmonic filter using a surface plasmon. According to the above configuration, by using the surface plasmon, a filter structure that selectively blocks the first scintillation light can be easily obtained.

The filter layer may have a plurality of columnar metal structures arranged periodically. According to the above configuration, a filter structure that selectively blocks the first scintillation light can be easily manufactured by adjusting the disposition (period) of the plurality of metal structures and the width and the height of the metal structure.

The metal structure may be configured by cylindrical aluminum. According to the above configuration, by adjusting the diameter and the height of the cylindrical aluminum, filter design for selectively blocking the first scintillation light can be easily performed.

The first scintillation light may be longer in decay time than the second scintillation light. According to the above configuration, the photodetection unit is capable of detecting only the second scintillation light, which is shorter in decay time, by selectively blocking the first scintillation light, which is one of the first scintillation light and the second scintillation light and is longer in decay time than the second scintillation light. As a result, the time resolution of the radiation detector can be improved.

The filter layer may be configured to selectively reflect the first scintillation light generated by the scintillator toward the scintillator. According to the above configuration, the amount of the first scintillation light that escapes to the photodetection unit side can be effectively reduced, and thus only the second scintillation light can be more suitably detected by the photodetection unit.

The scintillator may have a first surface facing the photodetection unit and a second surface not facing the photodetection unit, and at least a part of the second surface may be provided with a light absorption layer configured to absorb the first scintillation light reflected by the filter layer. According to the above configuration, by the light absorption layer absorbing the first scintillation light reflected by the filter layer, re-incidence of the first scintillation light toward the filter layer can be suppressed. As a result, the photodetection unit is capable of more suitably detecting only the second scintillation light.

The radiation detector described above may further include a second photodetection unit disposed on a side opposite to a side where the filter layer is provided with respect to the scintillator. According to the above configuration, the first scintillation light reflected by the filter layer can be detected by the second photodetection unit. As a result, for example, the time resolution can be improved by the photodetection unit detecting the second scintillation light and a detection light amount that is sufficient as a whole can be ensured by the second photodetection unit detecting the first scintillation light reflected by the filter layer. As a result, the detection accuracy of the radiation detector can be improved.

The radiation detector described above may further include a second filter layer disposed between the scintillator and the second photodetection unit and configured to selectively block the second scintillation light. According to the above configuration, the second photodetection unit is capable of suitably detecting only the first scintillation light.

The second filter layer may have a metasurface structure. According to the above configuration, the second filter layer can be suitably designed and manufactured by adopting the same metasurface structure as the filter layer.

The filter layer may be configured by a plurality of columnar bodies arranged periodically, and the second filter layer may be configured by a plurality of holes corresponding to the plurality of columnar bodies of the filter layer. According to the above configuration, the second filter layer opposite in properties to the filter layer can be easily designed and manufactured based on the Babine principle. In other words, by giving the metasurface structure of the second filter layer a shape corresponding to the metasurface structure of the filter layer (that is, a shape in an inversion relationship with the metasurface structure of the filter layer regarding the negative (recessed part) and the positive (projecting part)), the second filter layer having the property of selectively blocking the second scintillation light can be easily and reliably formed.

The photodetection unit may be a solid-state image sensor or an electron tube. According to the above configuration, the effect of the radiation detector described above can be exhibited in a configuration in which the scintillator and the filter layer are disposed as external members with respect to the solid-state image sensor or the electron tube. In other words, the radiation detector exhibiting the effect described above can be obtained by providing the scintillator and the filter layer with respect to, for example, an existing solid-state image sensor or electron tube.

The radiation detector may be an electron tube, the scintillator may be a light incident window of the electron tube, and the photodetection unit may be a photoelectric surface of the electron tube. According to the above configuration, the scintillator and the filter layer are built in an electron tube, and thus the entire radiation detector can be reduced in size as compared with when the scintillator and the filter layer are configured as external members of an electron tube. In addition, the detection light (second scintillation light) can be efficiently guided to the photoelectric surface.

The radiation detector described above may further include a protective film provided between the filter layer and the photodetection unit. According to the above configuration, the protective film is capable of appropriately preventing a chemical reaction between the scintillator and the photoelectric surface (photodetection unit).

A radiation detection device according to another aspect of the present disclosure includes a gantry where a plurality of the radiation detectors described above are arranged. By configuring the radiation detection device using the radiation detector having the structure described above, the radiation detection device capable of exhibiting the effect of the radiation detector described above can be obtained.

According to one aspect of the present disclosure, it is possible to provide a radiation detector and a radiation detection device capable of suitably detecting light having a wavelength of interest regardless of the wavelength region of the scintillation light and the shape of the emission peak.

DETAILED DESCRIPTION

Figure 1:
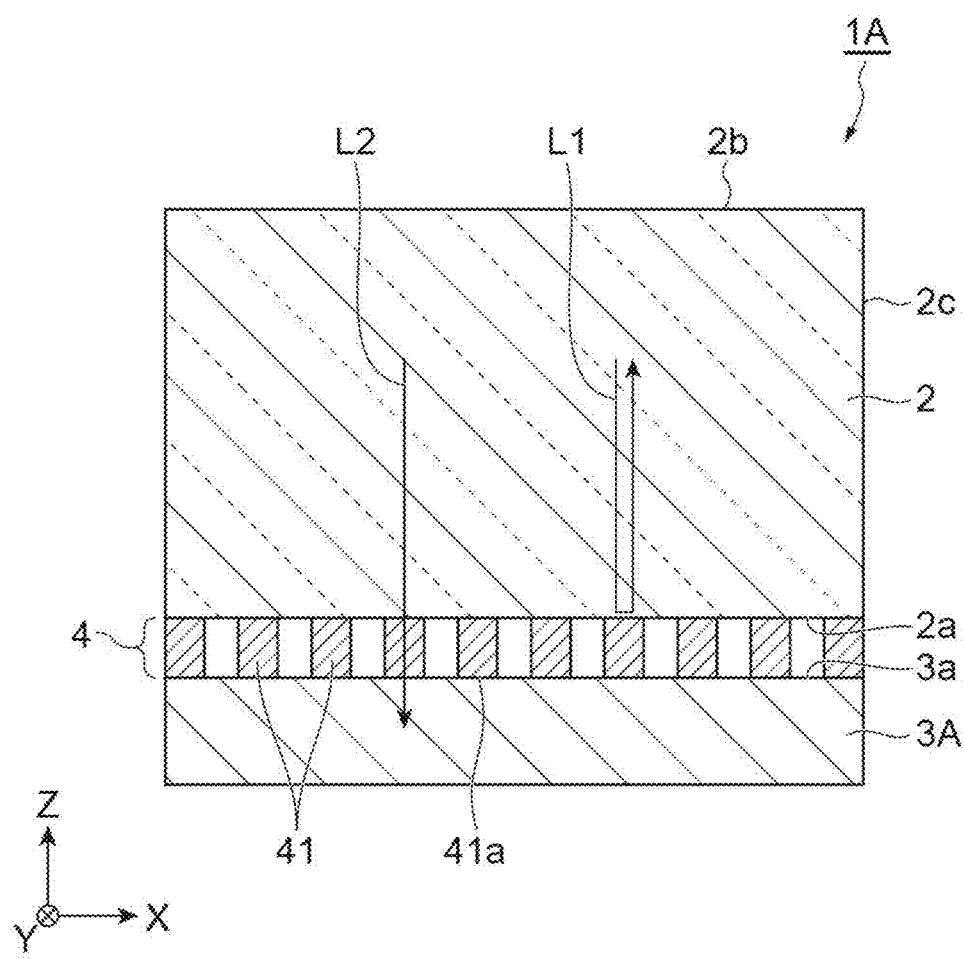
FIG. 1 is a cross-sectional view of a radiation detector of a first embodiment.

Hereinafter, an embodiment of the present invention will be described in detail with reference to the drawings. In the following description, the same reference numerals will be used for the same or equivalent elements with redundant description omitted. The dimensional ratio of each drawing does not always match the actual dimensional ratio.

First Embodiment

As illustrated in FIG. 1, a radiation detector 1A of a first embodiment is a detector that detects radiation such as X-rays. The radiation detector 1A is used in, for example, a positron emission tomography (so-called Time-Of-Flight Positron Emission Tomography (TOP-PET)) that uses annihilation radiation flight time information for image reconstruction (see FIG. 13). The radiation detector 1A has a scintillator 2, a photodetection unit 3A, and a filter layer 4. The external shape of the radiation detector 1A is, for example, a columnar shape (cylindrical shape as an example in the present embodiment). The filter layer 4 is disposed between the scintillator 2 and the photodetection unit 3A. In the present specification, for convenience of description, the direction in which the scintillator 2 and the photodetection unit 3A face each other across the filter layer 4 is referred to as a Z-axis direction, and two directions along a plane orthogonal to the Z-axis direction and orthogonal to each other are referred to as an X-axis direction and a Y-axis direction.

The scintillator 2 generates a plurality of (two or more) scintillation beams different in peak wavelength and decay time in response to the incidence of radiation such as X-rays.

Examples of the scintillator 2 having such a property include BaF2 and CdF3:Pr3+. In the present embodiment, the scintillator 2 is formed by BaF2.

Figure 2:
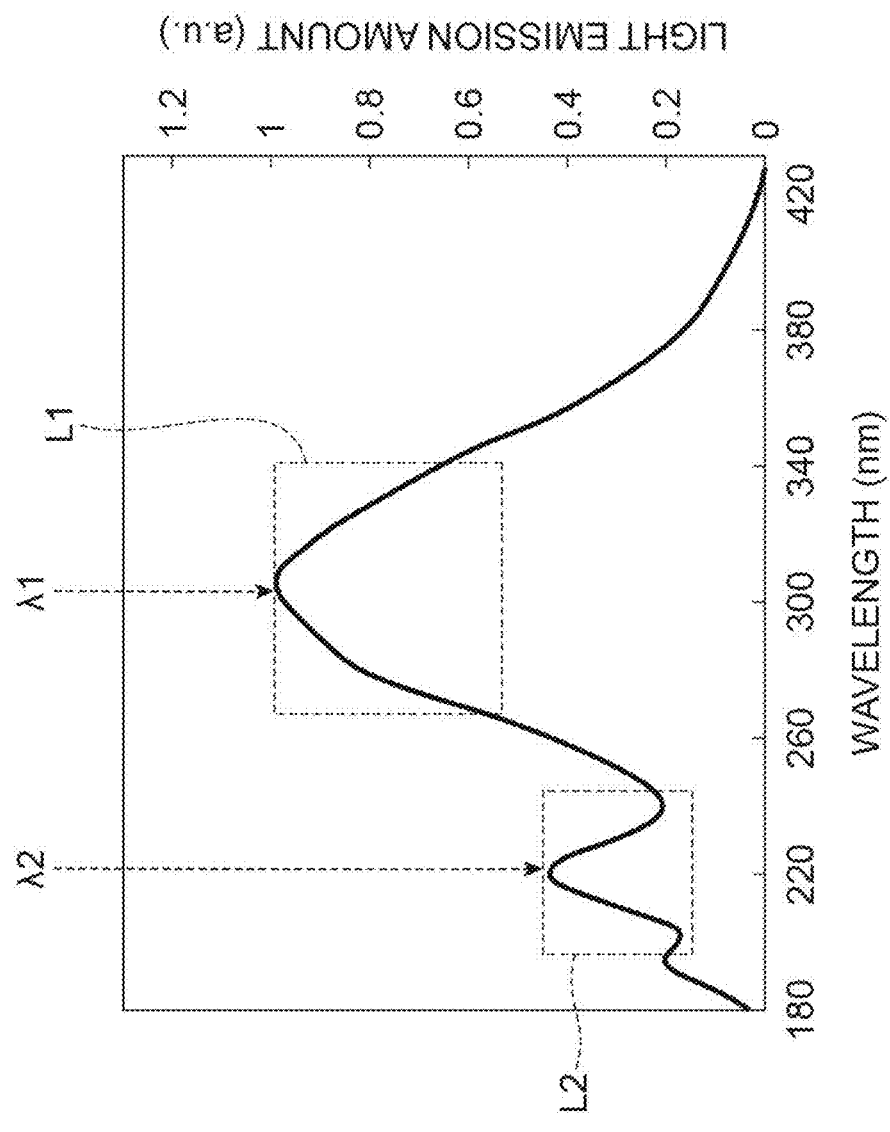
FIG. 2 is a diagram showing an emission spectrum of a scintillator ($BaF_2$).

As illustrated in FIG. 2, the scintillator 2 formed by BaF2 generates, in response to radiation incidence, scintillation light L1 (first scintillation light) having a peak wavelength λ1 (first peak wavelength) and scintillation light L2 (second scintillation light) having a peak wavelength λ2 (second peak wavelength). The peak wavelength λ1 is 300 nm, and the peak wavelength λ2 is 220 nm. In addition, decay time t1 of the scintillation light L1 is shorter than decay time t2 of the scintillation light L2 (t1<t2). More specifically, the decay time t1 is 550 ns, and the decay time t2 is 0.6 ns. As illustrated in FIG. 2, in BaF2, the scintillation light L1 is larger in light emission amount than the scintillation light L2.

As an example, the scintillator 2 is formed in a cylindrical shape. In other words, the scintillator 2 is formed in a circular shape when viewed in the Z-axis direction. The scintillator 2 has an inner surface 2a facing the photodetection unit 3A via the filter layer 4, an outer surface 2b positioned on a side opposite to the inner surface 2a in the Z-axis direction, and a cylindrical side surface 2c extending in the Z-axis direction so as to connect an edge portion of the inner surface 2a and an edge portion of the outer surface 2b. As an example, the outer surface 2b of the scintillator 2 functions as an incident surface on which radiation to be detected is incident, and the inner surface 2a functions as an exit surface that emits the scintillation light generated in the scintillator 2.

The photodetection unit 3A detects the scintillation light generated by the scintillator 2. In the present embodiment, the photodetection unit 3A is a solid-state image sensor such as a silicon photomultiplier (SiPM) such as a single-photon avalanche diode (SPAD). The photodetection unit 3A may be configured by another solid-state image sensor such as an avalanche photo diode (APD). The photodetection unit 3A has a photodetection surface 3a for incidence of light to be detected. The photodetection surface 3a faces the inner surface 2a of the scintillator 2 via the filter layer 4.

The filter layer 4 has a metasurface structure. The filter layer 4 selectively blocks the scintillation light L1 between the scintillation light L1 and the scintillation light L2 generated by the scintillator 2. In other words, the filter layer 4 transmits most of the scintillation light L2 from the scintillator 2 side to the photodetection unit 3A side and does not transmit most of the scintillation light L1 from the scintillator 2 side to the photodetection unit 3A side. For example, the filter layer 4 selectively reflects or absorbs the scintillation light L1. In the present embodiment, the filter layer 4 is configured to selectively reflect the scintillation light L1 toward the scintillator 2.

The filter layer 4 may be configured as a plasmonic filter using a surface plasmon (for example, a plasmonic color filter). In other words, the filter layer 4 has a metasurface structure configured to generate a surface plasmon. As illustrated in FIG. 1, the filter layer 4 has a plurality of columnar metal structures 41 periodically arranged along the XY plane. As an example, the metal structure 41 can be formed in a cylindrical shape. The plurality of metal structures 41 are arranged two-dimensionally (in a grid shape) along the XY plane. The filter layer 4 (that is, the plurality of metal structures 41) may be formed on the inner surface 2a of the scintillator 2 by evaporation or the like or may be formed on the photodetection surface 3a of the photodetection unit 3A by evaporation or the like. In the present embodiment, the filter layer 4 is formed on the inner surface 2a of the scintillator 2.

The metal structure 41 of the filter layer 4 can be formed of, for example, aluminum (Al), titanium oxide ($TiO_2$), hafnium oxide ($HfO_2$), gallium nitride (GaN), amorphous silicon (aSi), or the like. In the present embodiment, the metal structure 41 is made of aluminum (Al).

Figure 3C:
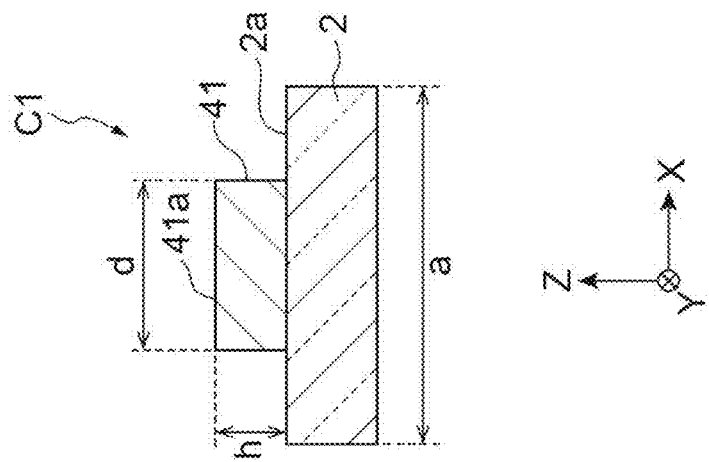
FIGS. 3A to 3C are diagrams illustrating a basic configuration (unit grid) of a filter layer.
Figure 3B:
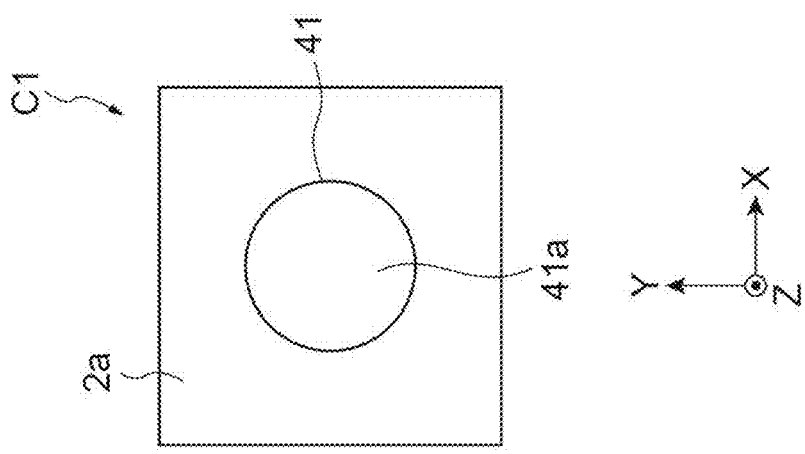
Figure 3A:
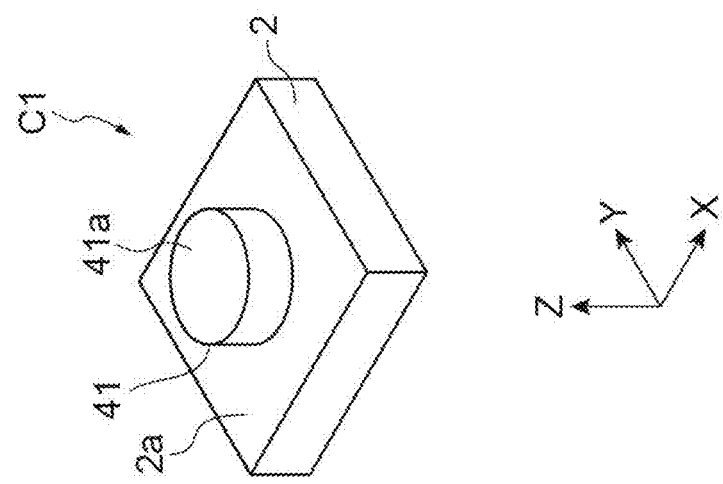

FIGS. 3A to 3C illustrate a unit grid C1 by which the filter layer 4 is configured. The filter layer 4 is a nanostructure (fine uneven structure) configured by periodically arranging the unit grid C1 illustrated in FIGS. 3A to 3C in a grid shape along the X-axis direction and the Y-axis direction. As an example, the unit grid C1 is a square region when viewed in the Z-axis direction. One cylindrical (disk-shaped) metal structure 41 is formed for each unit grid C1. The metal structure 41 is erected on the inner surface 2a of the scintillator 2 in the middle portion of the unit grid C1.

A period a of the metal structures 41 (that is, the distance (pitch) between the centers of two adjacent metal structures 41 and the length of one side of the unit grid C1) is set to be shorter than the wavelengths of the scintillation light L1 and the scintillation light L2 to be filtered. In the present embodiment, the wavelength of the scintillation light L1 is 300 nm, the wavelength of the scintillation light L2 is 220 nm, and thus the period a of the metal structures 41 is set to a value shorter than these wavelengths. The period a can be selected from, for example, the range of 150 nm to 200 nm. A width d (diameter) of the metal structure 41 can be selected from, for example, the range of 80 nm to 140 nm. A height h of the metal structure 41 can be selected from, for example, the range of 30 nm to 70 nm. The height of the metal structure 41 is the length from the inner surface 2a of the scintillator 2 to a top surface 41a of the metal structure 41.

Figure 4:
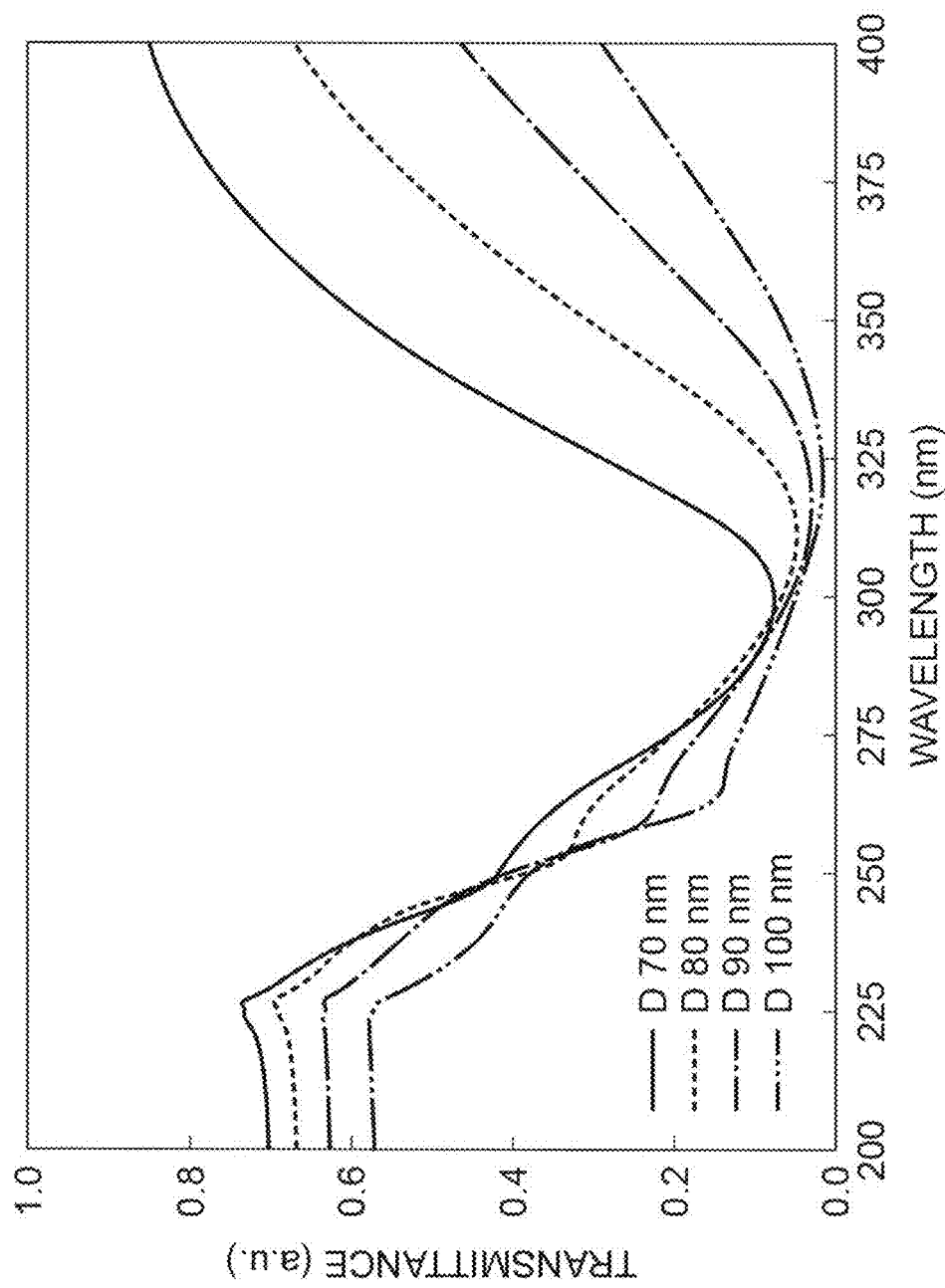
FIG. 4 is a diagram showing a transmittance of the filter layer for each wavelength.

FIG. 4 is a diagram showing the transmittance of the filter layer 4 for each wavelength (wavelength-transmittance relationship). FIG. 4 shows simulation results when the period a of the unit grid C1 is 150 nm, the height h of the metal structure 41 is 30 nm, and the width d of the metal structure 41 is 70 nm, 80 nm, 90 nm, and 100 nm. In FIG. 4, the horizontal axis represents the wavelength (inn) of the light incident on the filter layer 4, and the vertical axis represents the transmittance of the light incident on the filter layer 4. The transmittance shown in FIG. 4 represents a value in relation to a transmittance of 100% as a reference value (=1). As shown in FIG. 4, by setting the period a, the height h, and the width d as described above, the transmittance can be a value close to zero with respect to the scintillation light L1 having the peak wavelength λ1 (=300 nm). Meanwhile, regarding the scintillation light L2 having the peak wavelength λ2 (=220 nm), a transmittance of a certain level or more (around 0.6) can be ensured. In other words, by setting the period a, the height h, and the width d as described above, the filter layer 4 can be configured to selectively block the scintillation light L1 (that is, selectively transmit the scintillation light L2).

Figure 5:
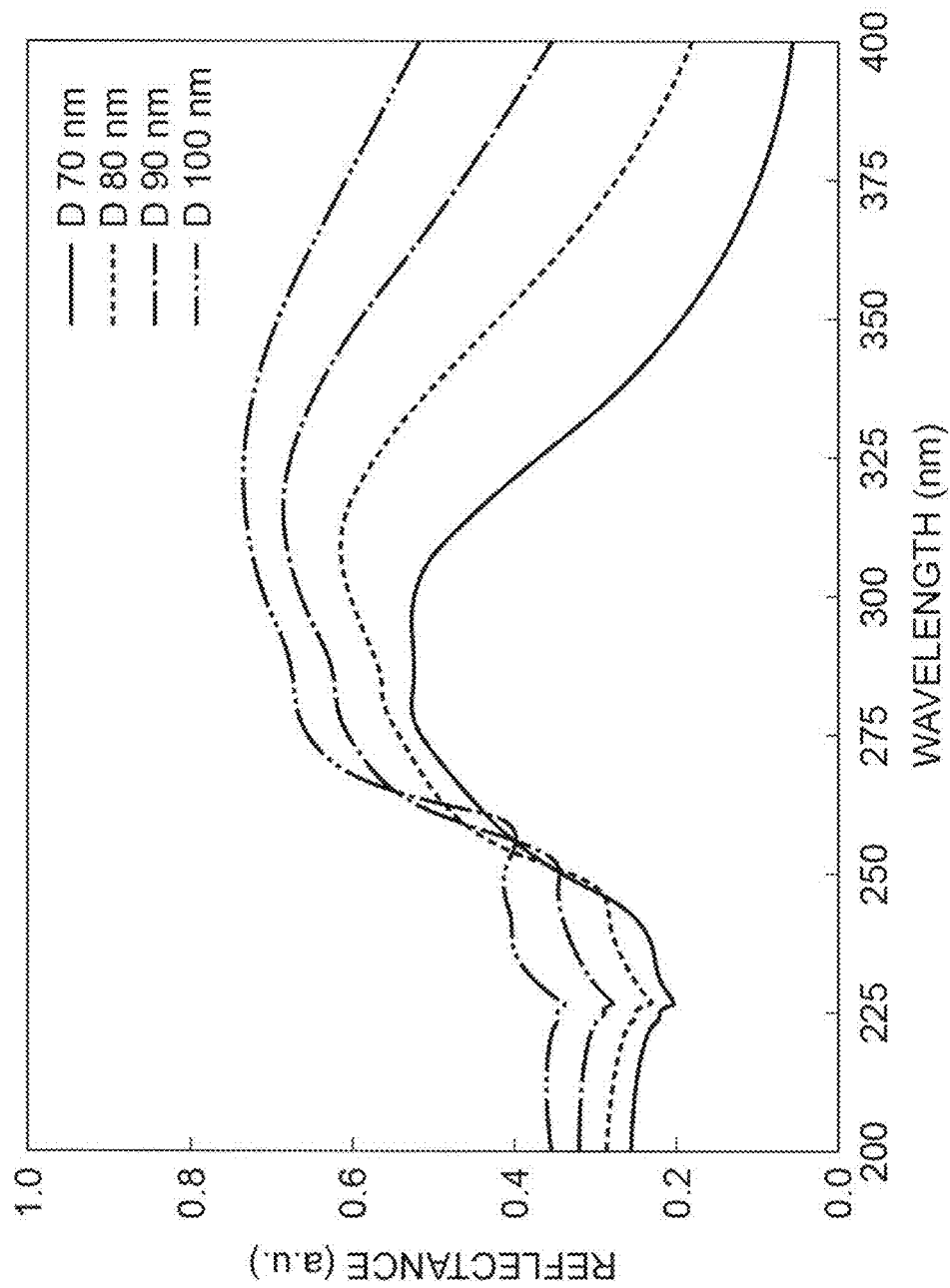
FIG. 5 is a diagram showing a reflectance of the filter layer for each wavelength.

FIG. 5 is a diagram showing the reflectance of the filter layer 4 for each wavelength (wavelength-reflectance relationship). FIG. 5 shows simulation results when the period a of the unit grid C1 is 150 nm, the height h of the metal structure 41 is 30 nm, and the width d of the metal structure 41 is 70 nm, 80 nm, 90 nm, and 100 nm. In FIG. 5, the horizontal axis represents the wavelength (nm) of the light incident on the filter layer 4, and the vertical axis represents the reflectance of the light incident on the filter layer 4. The reflectance shown in FIG. 5 represents a value in relation to a reflectance of 100% as a reference value (=1). As shown in FIG. 5, by setting the period a, the height h, and the width d as described above, the reflectance can be at a certain level or more (0.5 or more) with respect to the scintillation light L1 having the peak wavelength $\lambda 1$ (=300 nm). Meanwhile, regarding the scintillation light L2 having the peak wavelength $\lambda 2$ (=220 nm), the reflectance can be a low value of approximately 0.2. In other words, by setting the period a, the height h, and the width d as described above, the filter layer 4 can be configured to selectively reflect the scintillation light L1.

An example of a process for manufacturing the filter layer 4 will be described with reference to FIG. 6. First, an electron beam (EB) resist R is applied (film formation) on the inner surface 2a of the scintillator 2 (step S1). A film thickness of the EB resist R is, for example, approximately 300 nm. Subsequently, a predesigned pattern is EB-drawn with respect to the EB resist R by EB lithography (step S2). Specifically, by removing a part of the EB resist R, an opening Ra is formed that corresponds to the part where the metal structure 41 is to be formed. Subsequently, an aluminum film 40 is formed on the EB resist R by an evaporation method (for example, resistance heating evaporation) (step S3). The film thickness of the aluminum film 40 is, for example, approximately 30 nm. By a part of the aluminum film 40 entering the opening Ra formed in the EB resist R, the aluminum film 40 is formed on the inner surface 2a of the scintillator 2 in the opening Ra as well. Subsequently, the EB resist R on the scintillator 2 is removed by lift-off treatment (step S4). At this time, the aluminum film 40 formed on the EB resist R is also removed. As a result, only the cylindrical aluminum film 40 formed at the position corresponding to the opening Ra of the EB resist R is left on the inner surface 2a of the scintillator 2. This cylindrical aluminum film 40 corresponds to the metal structure 41 described above.

The filter layer 4 (top surface 41a of the metal structure 41) may abut against the photodetection surface 3a of the photodetection unit 3A or may be disposed so as to be separated from the photodetection surface 3a. From the viewpoint of effectively taking the scintillation light transmitted through the filter layer 4 into the photodetection unit 3A, it is preferable that the filter layer 4 abuts against (is in close contact with) the photodetection surface 3a. In this case, it is preferable not to provide an adhesive (adhesive layer) between the filter layer 4 and the photodetection surface 3a of the photodetection unit 3A (interface). This is to prevent the scintillation light to be detected (scintillation light L2 having a wavelength of 220 nm) from being absorbed by an adhesive.

In addition, the filter layer 4 may be formed not on the inner surface 2a of the scintillator 2 but on the photodetection surface 3a of the photodetection unit 3A. In this case as well, the filter layer 4 can be formed by the same procedure as the procedure described above. In other words, by executing a procedure in which "the inner surface 2a of the scintillator 2" in the procedure illustrated in FIG. 6 is replaced with "the photodetection surface 3a of the photodetection unit 3A", the filter layer 4 can be formed on the photodetection surface 3a of the photodetection unit 3A. In this case, the filter layer 4 (top surface 41a of the metal structure 41) may abut against the inner surface 2a of the scintillator 2 or may be disposed so as to be separated from the inner surface 2a. From the viewpoint of effectively taking the scintillation light transmitted through the filter layer 4 into the photodetection unit 3A, it is preferable that the filter layer 4 abuts against (is in close contact with) the inner surface 2a. In this case as well, for the same reason as described above, it is preferable not to provide an adhesive (adhesive layer) between the filter layer 4 and the inner surface 2a of the scintillator 2 (interface).

Effects

In the radiation detector 1A described above, the scintillator 2 generates the two scintillation light L1 and scintillation light L2 having different peak wavelengths. The filter layer 4 disposed between the scintillator 2 and the photodetection unit 3A selectively blocks the scintillation light L1 having the peak wavelength $\lambda 1$ (300 nm in the present embodiment). In other words, the scintillation light L2 having the peak wavelength $\lambda 2$ (220 nm in the present embodiment) is selectively transmitted to the photodetection unit 3A. Here, the filter layer 4 is configured by a metasurface structure instead of a resin film. By configuring the filter layer 4 with the metasurface structure, the following advantages can be obtained as compared with when the filter layer 4 is configured by a resin film. That is, by controlling the shape of the metasurface structure, better filter performance than when the filter layer is configured by a resin film can be obtained regardless of the wavelength region of the scintillation light and the shape of the emission peak (resonance peak width or the like). In other words, light having a wavelength of interest (here, the scintillation light L2 having the peak wavelength $\lambda 2$) can be suitably transmitted, and light having a wavelength other than the wavelength of interest (here, the scintillation light L1 having the peak wavelength $\lambda 1$) can be suitably blocked. Accordingly, with the radiation detector 1A, light having a wavelength of interest can be suitably detected regardless of the wavelength region of the scintillation light and the shape of the emission peak.

The filter layer 4 is a plasmonic filter using a surface plasmon. According to the above configuration, by using the surface plasmon, a filter structure that selectively blocks one of the scintillation light L1 and the scintillation light L2 (in the present embodiment, the scintillation light L1) can be easily obtained. In other words, by designing the metasurface structure of the filter layer 4 (in the present embodiment, the micro uneven structure including the plurality of metal structures 41) so as to exhibit the surface plasmon effect, the filter layer 4 selectively blocking only scintillation light in a specific wavelength band can be obtained.

The filter layer 4 has the plurality of columnar metal structures 41 arranged periodically. According to the above configuration, a filter structure that selectively blocks one of the scintillation light L1 and the scintillation light L2 (in the present embodiment, the scintillation light L1) can be easily obtained by adjusting the disposition (period a) of the plurality of metal structures 41 and the width d and the height h of the metal structure 41.

The metal structure 41 is configured by cylindrical aluminum. According to the above configuration, by adjusting the diameter (width d) and the height h of the cylindrical aluminum, filter design for selectively blocking the scintillation light L1 can be easily performed.

The decay time t1 of the scintillation light L1 is longer than the decay time t2 of the scintillation light L2. In other words, in the radiation detector 1A, the filter layer 4 is configured to selectively block the scintillation light L1, which is one of the two scintillation light L1 and scintillation light L2 having the different decay time t1 and decay time t2 and is longer in decay time than the scintillation light L2. According to the above configuration, the photodetection unit 3A is capable of detecting only the scintillation light L2, which is shorter in decay time. As a result, the time resolution of the radiation detector 1A can be improved. In particular, in the present embodiment, BaF2 is used as the scintillator 2 and there is a very large difference of approximately 1000 times between the decay time t1 of the scintillation light L1 and the decay time t2 of the scintillation light L2 (that is, t1/t2≈1000). Here, when the scintillation light L1 having a certain amount of light or more is detected by the photodetection unit 3A together with the scintillation light L2, the time resolution deteriorates due to the effect of the scintillation light L1 which takes a long time to decay. On the other hand, the deterioration of the time resolution described above can be suppressed by blocking the scintillation light L1 by the filter layer 4 and selectively guiding the scintillation light L2, which is shorter in decay time, to the photodetection unit 3A as in the present embodiment.

The filter layer 4 selectively reflects the scintillation light L1 generated by the scintillator 2 toward the scintillator 2. According to the above configuration, the amount of the scintillation light L1 that escapes to the photodetection unit 3A side can be effectively reduced, and thus only the scintillation light L2 can be more suitably detected by the photodetection unit 3A.

The photodetection unit 3A is a solid-state image sensor. According to the above configuration, the effect of the radiation detector 1A described above can be exhibited in a configuration in which the scintillator 2 and the filter layer 4 are disposed as external members with respect to the photodetection unit 3A, which is a solid-state image sensor. In other words, the radiation detector 1A exhibiting the effect described above can be obtained by providing the scintillator 2 and the filter layer 4 with respect to an existing solid-state image sensor.

Second Embodiment

Figure 7:
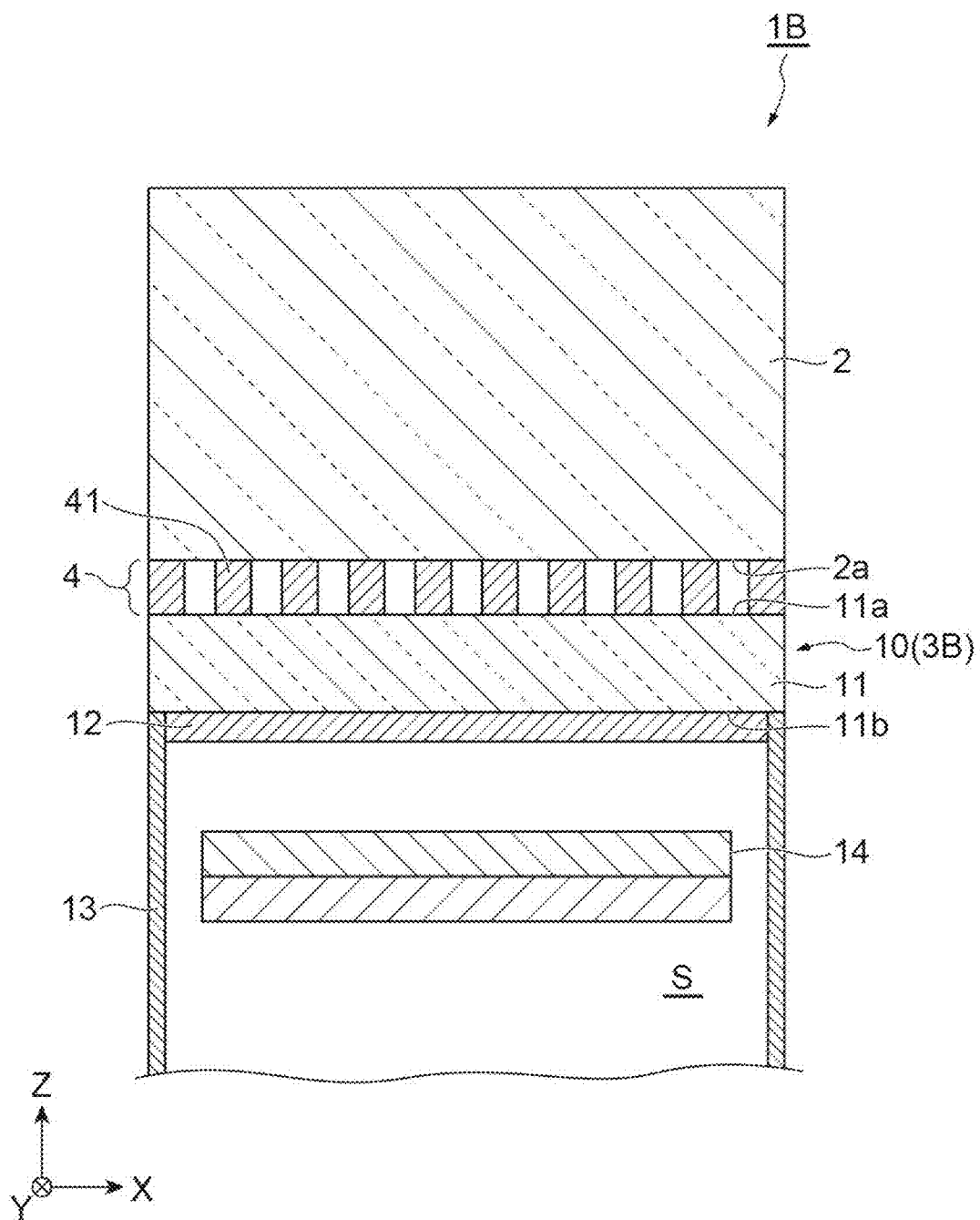
FIG. 7 is a cross-sectional view of a radiation detector of a second embodiment.

As illustrated in FIG. 7, a radiation detector 1B of a second embodiment is different from the radiation detector 1A in that a photodetection unit 3B is provided instead of the photodetection unit 3A. The other configurations of the radiation detector 1B are the same as those of the radiation detector 1A. The photodetection unit 3B is configured by a photomultiplier tube 10 having a built-in microchannel plate (so-called microchannel plate photomultiplier tube (MCP-PMT)). The photomultiplier tube 10 is an electron tube having a vacuum internal space S. The photomultiplier tube 10 has a light incident window 11, a photoelectric surface 12, a tubular member 13, and a microchannel plate (MCP) 14.

The light incident window 11 is a member where the scintillation light generated by the scintillator 2 is incident. The light incident window 11 is formed in, for example, a cylindrical shape. The light incident window 11 is provided so as to airtightly seal one open end of the tubular member 13 (open end on the scintillator 2 side). The light incident window 11 is formed of, for example, magnesium fluoride (MgF2) or synthetic quartz. The filter layer 4 is disposed between the inner surface 2a of the scintillator 2 and a light incident surface 11a, which is the outer surface of the light incident window 11. The filter layer 4 (plurality of metal structures 41) may be formed on the inner surface 2a of the scintillator 2 or may be formed on the light incident surface 11a of the light incident window 11.

The photoelectric surface 12 is provided on an inner surface 11b of the light incident window 11 (surface on the internal space S side). When the filter layer 4 is formed on the light incident surface 11a, the photoelectric surface 12 may be formed on the inner surface 11b after the filter layer 4 is formed on the light incident surface 11a. The photoelectric surface 12 is a so-called transmissive photoelectric surface. In other words, the photoelectric surface 12 emits photoelectrons from the internal space S side when light is incident from the light incident window 11 side. The photoelectric surface 12 is formed with, for example, an alkali metal contained. Examples of the material of the photoelectric surface 12 include alkali-antimony. A cathode is configured by the photoelectric surface 12.

At least a part of the side tube of the photomultiplier tube 10 is configured by the tubular member 13. The tubular member 13 accommodates the MCP 14 and an anode (not illustrated). The MCP 14 inputs the photoelectrons emitted from the photoelectric surface 12 and multiplies the photoelectrons. The anode collects the photoelectrons multiplied by the MCP 14 and takes the photoelectrons to the outside as an electric signal.

According to the second embodiment, the same effect as the radiation detector 1A described above can be exhibited in a configuration in which the scintillator 2 and the filter layer 4 are disposed as external members with respect to the photodetection unit 3B, which is an electron tube (here, as an example, a photomultiplier tube). In other words, the radiation detector 1B exhibiting the effect described above can be obtained by providing the scintillator 2 and the filter layer 4 with respect to an existing electron tube.

Third Embodiment

Figure 8:
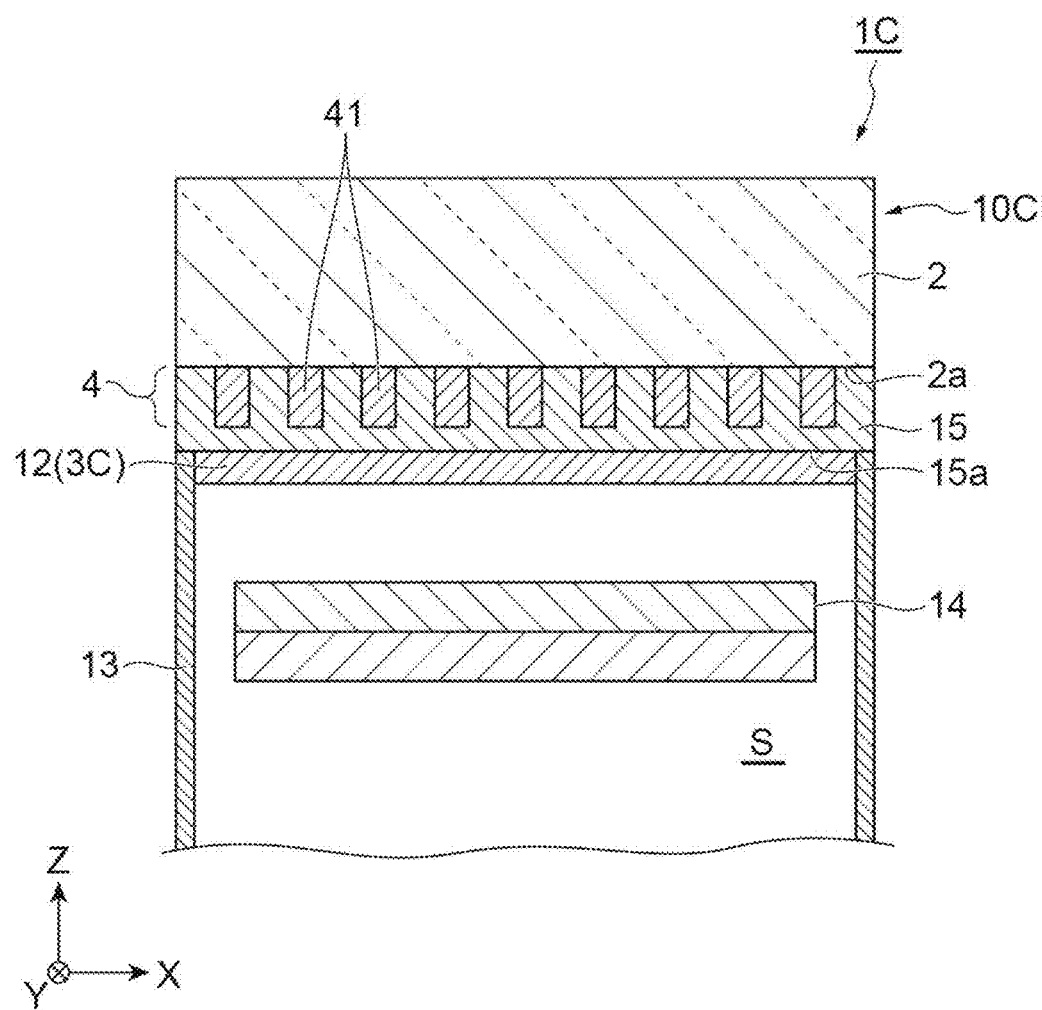
FIG. 8 is a cross-sectional view of a radiation detector of a third embodiment.

As illustrated in FIG. 8, a radiation detector 1C of a third embodiment is configured as a photomultiplier tube 10C (electron tube). In the radiation detector 1C, the scintillator 2 is the light incident window of the photomultiplier tube 10C, and a photodetection unit 3C is the photoelectric surface 12. In other words, the scintillator 2 and the filter layer 4 are built in a photodetector that is a photomultiplier tube (photomultiplier tube 10C) in the radiation detector 1C whereas the scintillator 2 and the filter layer 4 are configured as external members with respect to a photodetector that is a photomultiplier tube (photodetection unit 3B) in the radiation detector 1B described above.

In the radiation detector 1C, the filter layer 4 (plurality of metal structures 41) is formed on the inner surface 2a of the scintillator 2 as in the radiation detectors 1A and 1B. Further, in the radiation detector 1C, a protective film 15 is provided between the filter layer 4 and the photoelectric surface 12 (photodetection unit 3C). The protective film 15 is formed of, for example, aluminum oxide ($Al_2O_3$). The protective film 15 functions as a barrier layer that blocks a reaction between the material of the scintillator 2 and the photoelectric surface 12.

Figure 6:
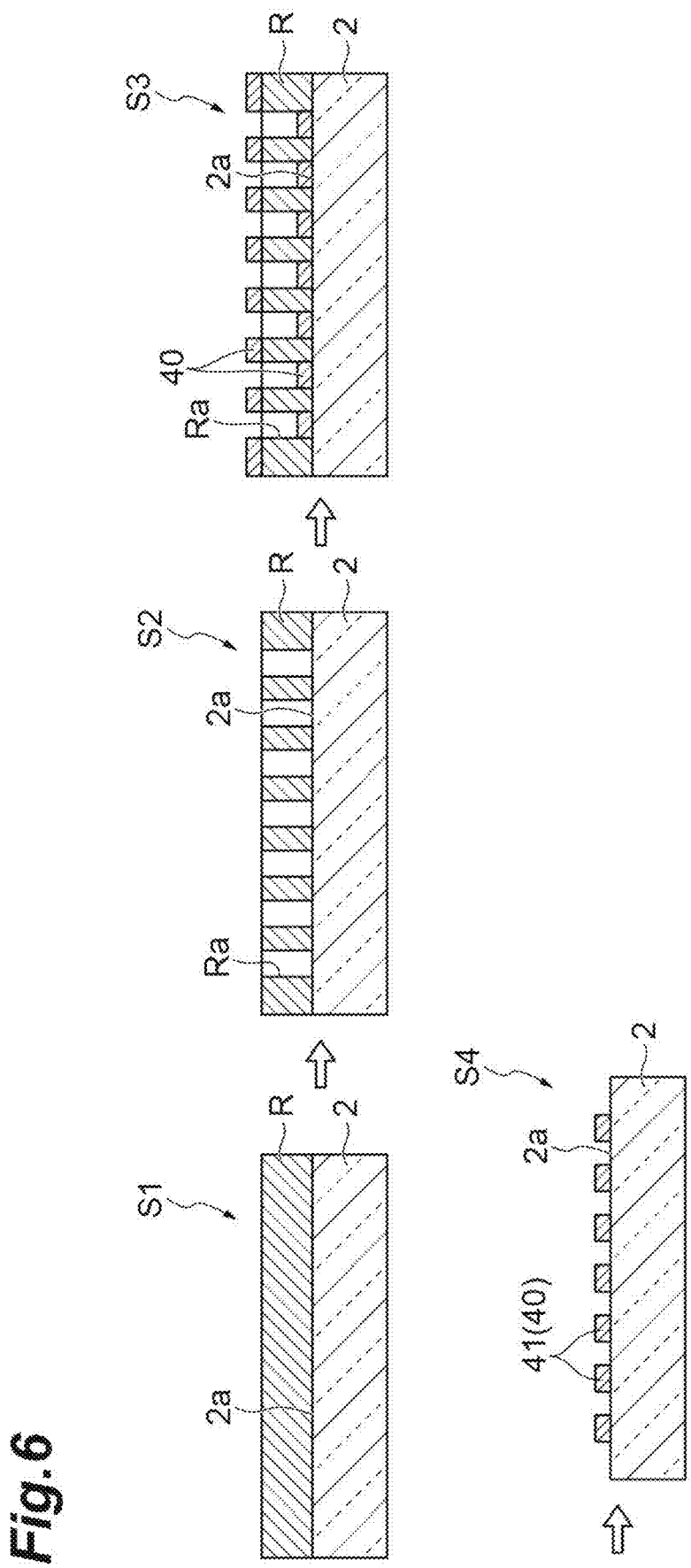
FIG. 6 is a diagram illustrating an example of a process for manufacturing the filter layer.

The protective film 15 is formed by, for example, forming an $Al_2O_3$ film by atomic layer deposition (ALD) or the like with respect to the inner surface 2a of the scintillator 2 where the plurality of metal structures 41 are formed after the step S4 (lift-off treatment) illustrated in FIG. 6. The protective film 15 is formed so as to cover the inner surface 2a of the scintillator 2 (part where the metal structure 41 is not provided) and the top surface 41a of the metal structure 41. In other words, the thickness of the protective film 15 (height from the inner surface 2a) is larger than the height h of the metal structure 41 (see FIG. 3C). The thickness of the protective film 15 is, for example, approximately "the height h of the metal structure 41+1 nm" to "the height h of the metal structure 41+5 nm". For example, the thickness of the protective film 15 is approximately 31 nm to 35 nm when the height h of the metal structure 41 is 30 nm.

The photoelectric surface 12 is provided in the middle portion excluding the edge portion of a surface 15a of the protective film 15 (surface on the side opposite to the inner surface 2a side of the scintillator 2). In addition, one open end of the tubular member 13 (open end on the scintillator 2 side) is airtightly joined to an edge portion of the surface 15a of the protective film 15.

According to the third embodiment, the scintillator 2 and the filter layer 4 are built in an electron tube (photomultiplier tube as an example in the present embodiment), and thus the entire radiation detector 1C can be reduced in size as compared with when the scintillator 2 and the filter layer 4 are configured as external members of an electron tube. In addition, the detection light (scintillation light L2) can be efficiently guided to the photoelectric surface 12. In addition, in the above configuration, the protective film provided between the filter layer 4 and the photoelectric surface 12 (photodetection unit 3C) is capable of appropriately preventing a chemical reaction between the scintillator 2 and the photoelectric surface 12.

Fourth Embodiment

Figure 9:
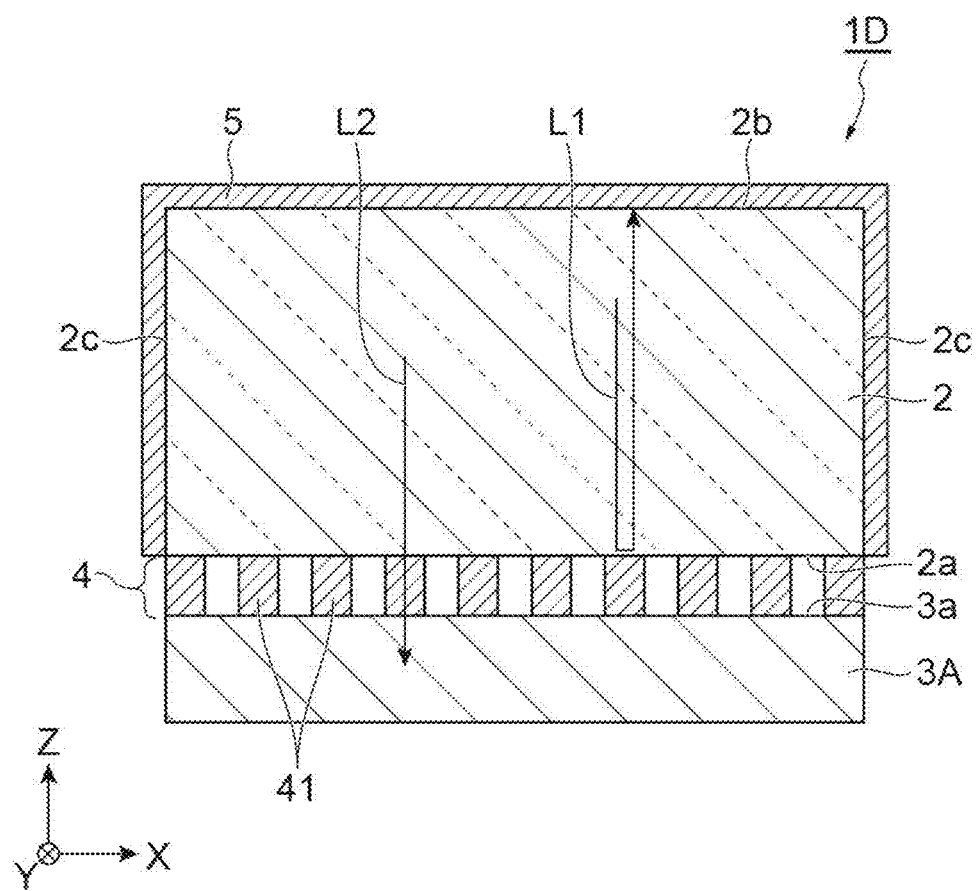
FIG. 9 is a cross-sectional view of a radiation detector of a fourth embodiment.

As illustrated in FIG. 9, a radiation detector 1D of a fourth embodiment is different from the radiation detector 1A of the first embodiment in that the radiation detector 1D further includes a light absorption layer 5. The other configurations of the radiation detector 1D are the same as those of the radiation detector 1A. As described in the first embodiment, the scintillator 2 has the inner surface 2a (first surface) facing the photodetection unit 3A and has the outer surface 2b (second surface) and the side surface 2c (second surface) not facing the photodetection unit 3A. The light absorption layer 5 is provided on at least a part of this second surface (in the present embodiment, as an example, the entire outer surface 2b and side surface 2c). The light absorption layer 5 absorbs the scintillation light L1 reflected by the filter layer 4. The light absorption layer 5 is, for example, a black tape attached to the outer surface 2b and the side surface 2c.

According to the fourth embodiment, by the light absorption layer 5 absorbing the scintillation light L1 reflected by the filter layer 4, re-incidence of the scintillation light L1 toward the filter layer 4 can be suppressed. As a result, the photodetection unit 3A is capable of more suitably detecting only the scintillation light L2. For example, the filter layer 4 can be designed to suitably block (reflect or absorb) the scintillation light L1 incident at a specific incident angle (in a specific incident angle range). If the scintillation light L1 incident on the filter layer 4 at the specific incident angle and reflected by the filter layer 4 returns to the filter layer 4 at an incident angle different from the specific incident angle, the scintillation light L1 (return light) may pass through the filter layer 4. By providing the light absorption layer 5 as described above, the generation of the return light can be suppressed.

Fifth Embodiment

Figure 10:
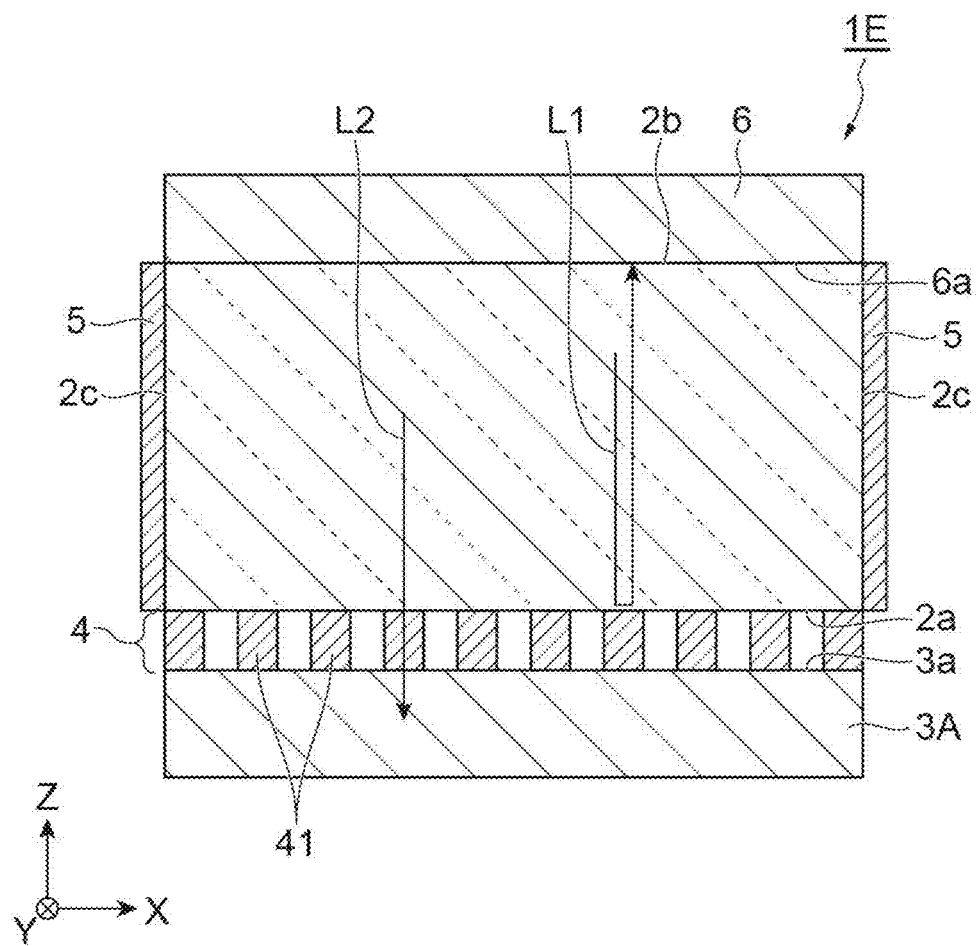
FIG. 10 is a cross-sectional view of a radiation detector of a fifth embodiment.

As illustrated in FIG. 10, a radiation detector 1E of a fifth embodiment is different from the radiation detector 1D of the fourth embodiment in that a photodetection unit 6 (second photodetection unit) is provided instead of the light absorption layer 5 on the outer surface 2b of the scintillator 2. The other configurations of the radiation detector 1E are the same as those of the radiation detector 1D. The photodetection unit 6 is disposed such that a photodetection surface 6a of the photodetection unit 6 faces the outer surface 2b of the scintillator 2. Although the type of the photodetection unit 6 is not particularly limited, the photodetection unit 6 can be configured by, for example, a SiPM.

According to the fifth embodiment, the scintillation light L1 reflected by the filter layer 4 can be detected by the photodetection unit 6. As a result, for example, the time resolution can be improved by the photodetection unit 3A detecting the scintillation light L2, which is shorter in decay time than the scintillation light L1, and a detection light amount that is sufficient as a whole can be ensured by the photodetection unit 6 detecting the scintillation light L1 larger in light emission amount than the scintillation light L2 instead of being longer in decay time than the scintillation light L2. As a result, the detection accuracy of the radiation detector 1E can be improved. In other words, by the photodetection units 3A and 6 separately detecting the scintillation light L1 and the scintillation light L2, the time resolution can be improved and a detection light amount can be ensured at the same time. More specifically, the photodetection unit 3A is capable of acquiring time information and the photodetection unit 6 is capable of acquiring information related to information other than the time information (for example, radiation energy, type, and so on). The roles of the photodetection units 3A and 6 can be clearly separated as described above, and thus the signal processing in the subsequent stage can be simplified.

Sixth Embodiment

Figure 11:
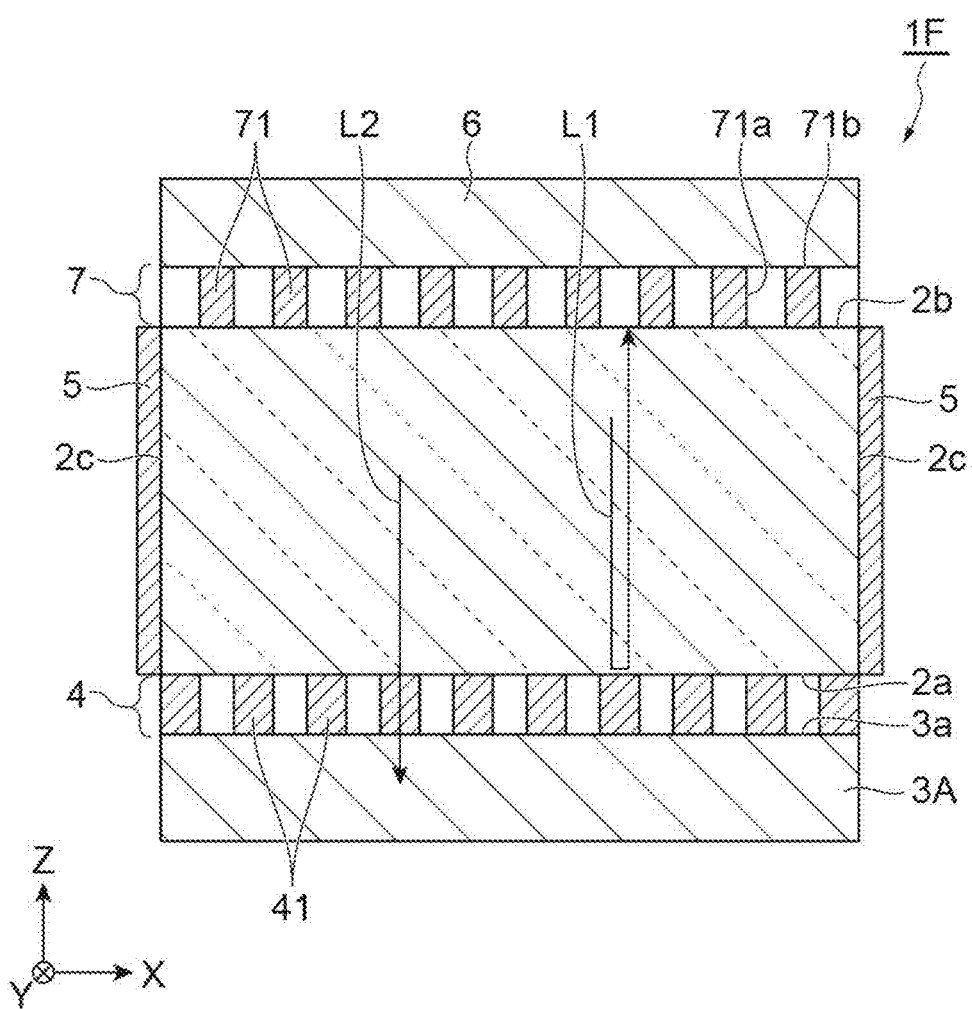
FIG. 11 is a cross-sectional view of a radiation detector of a sixth embodiment.

As illustrated in FIG. 11, a radiation detector 1F of a sixth embodiment is different from the radiation detector 1E of the fifth embodiment in that the radiation detector 1F further includes a filter layer 7 (second filter layer) disposed between the scintillator 2 and the photodetection unit 6. The other configurations of the radiation detector 1F are the same as those of the radiation detector 1E. The filter layer 7 is configured to selectively transmit the scintillation light L1. In other words, the filter layer 7 is configured to selectively block the scintillation light L2. In the present embodiment, the filter layer 7 is configured by a plurality of holes 71a corresponding to the plurality of columnar bodies (metal structures 41) of the filter layer 4. In other words, the filter layer 7 has a structure in which the metal structures 41 (projecting portions) of the filter layer 4 and the spaces between the metal structures 41 (spaces where the metal structure 41 is not provided) (recessed portions) are inverted. More specifically, the filter layer 7 is formed by metal structures 71 having the plurality of cylindrical holes 71a (recessed portions) disposed in a grid shape as in the case of the plurality of metal structures 41 in the filter layer 4.

Figure 12C:
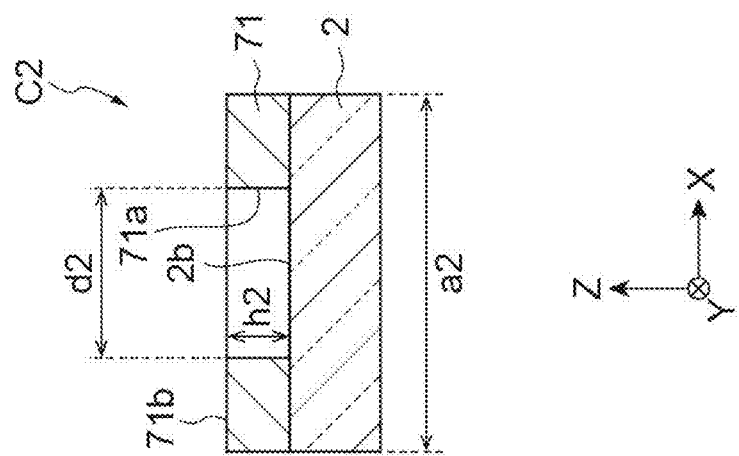
FIG. 12A to 12C are diagrams illustrating a basic configuration (unit grid) of a second filter layer.
Figure 12B:
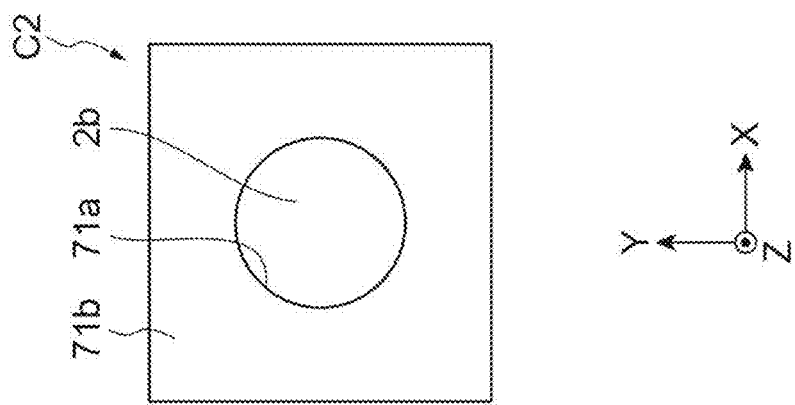
Figure 12A:
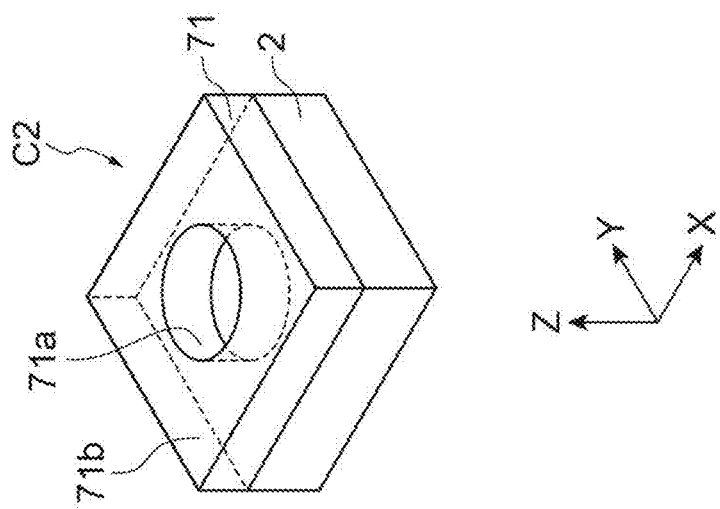

FIGS. 12A to 12C illustrate a unit grid C2 by which the filter layer 7 is configured. The filter layer 7 is a nanostructure (fine uneven structure) configured by periodically arranging the unit grid C2 illustrated in FIGS. 12A to 12C in a grid shape along the X-axis direction and the Y-axis direction. As an example, the unit grid C2 is a square region when viewed in the Z-axis direction. One cylindrical (disk-shaped) hole 71a is formed for each unit grid C2. The hole 71a is provided in the middle portion of the metal structure 71 in the unit grid C2.

A period a2 of the holes 71a (that is, the distance (pitch) between the centers of two adjacent holes 71a and the length of one side of the unit grid C2) is set to be shorter than the wavelengths of the scintillation light L1 and the scintillation light L2 to be filtered as in the case of the period a of the filter layer 4 described above. In other words, the wavelength of the scintillation light L1 is 300 nm, the wavelength of the scintillation light L2 is 220 nm, and thus the period a2 of the holes 71a is set to a value shorter than these wavelengths. The period a2 can be selected from, for example, the range of 150 nm to 200 nm. A width d2 (diameter) of the hole 71a can be selected from, for example, the range of 80 nm to 140 nm as in the case of the width d of the metal structure 41 described above. A height h2 (depth) of the hole 71a can be selected from, for example, the range of 30 nm to 70 nm as in the case of the height h of the metal structure 41 described above. The height h2 of the hole 71a is the length from the outer surface 2b of the scintillator 2 to a top surface 71b of the metal structure 71.

According to the sixth embodiment, the component of the scintillation light L2 toward the outer surface 2b side of the scintillator 2 is blocked by the filter layer 7, and thus only the scintillation light L1 can be suitably detected by the photodetection unit 6. In addition, the filter layer 7 has a metasurface structure. In this case, the filter layer 7 can be suitably designed and manufactured by adopting the same metasurface structure as the filter layer 4. In addition, the filter layer 7 is configured by the plurality of holes 71a corresponding to the plurality of metal structures 41 of the filter layer 4. According to the above configuration, the filter layer 7 opposite in properties to the filter layer 4 can be easily designed and manufactured based on the Babine principle. In other words, by giving the metasurface structure of the filter layer 7 a shape corresponding to the metasurface structure of the filter layer 4 (that is, a shape in an inversion relationship with the metasurface structure of the filter layer 4 regarding the negative (recessed part) and the positive (projecting part)), the filter layer 7 having the property of selectively blocking the scintillation light L2 can be easily and reliably formed.

[Radiation Detection Device]

Figure 13:
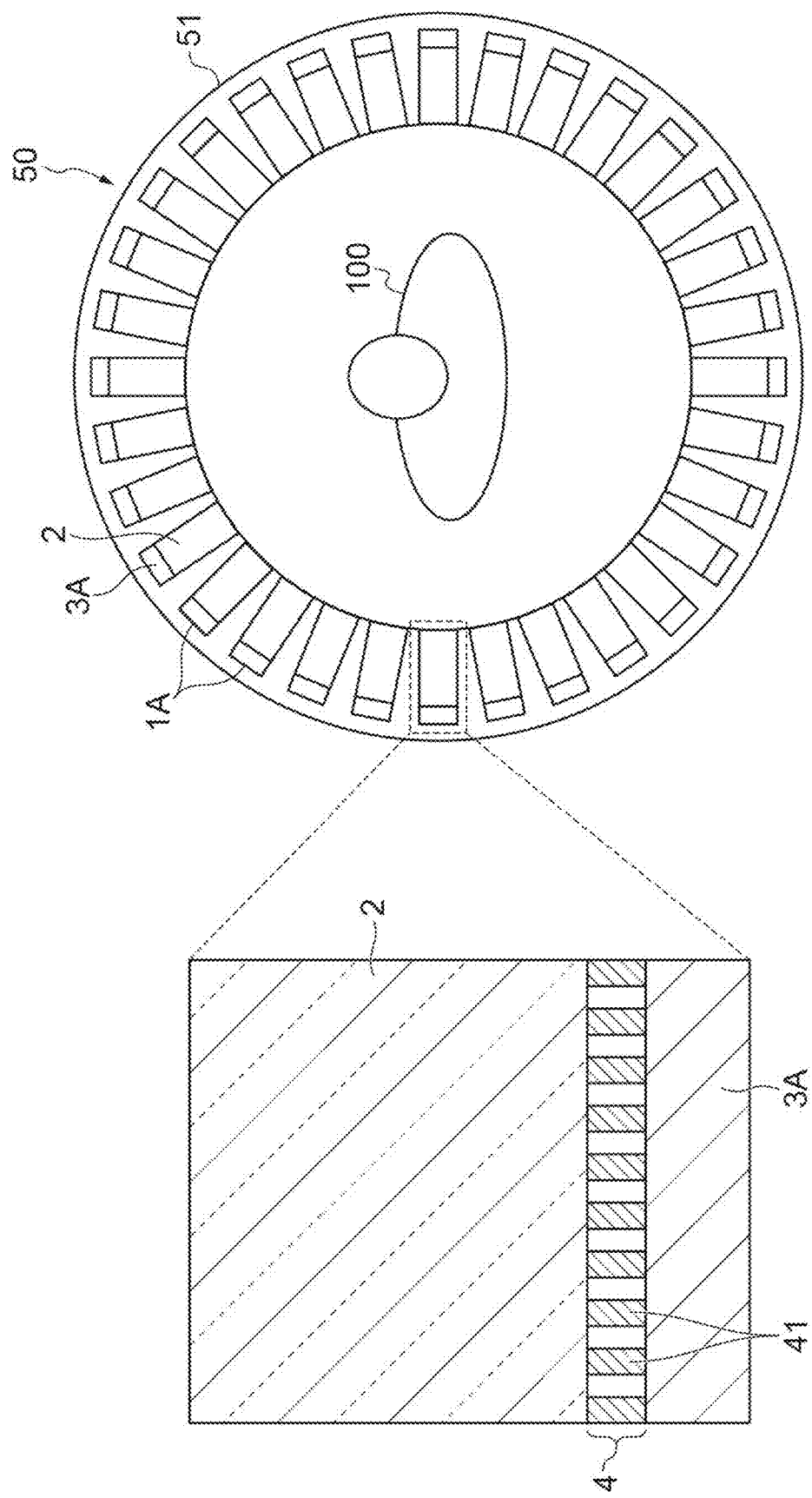
FIG. 13 is a schematic configuration diagram of a radiation detection device of one embodiment.

As illustrated in FIG. 13, a radiation detection device 50 of one embodiment includes a gantry 51 where a plurality of the radiation detectors 1A of the first embodiment are arranged. The radiation detection device 50 is, for example, a positron emission tomography (TOP-PET). The gantry 51 has a circular ring shape (doughnut shape). In this example, the plurality of radiation detectors 1A are disposed in a circle over the entire circumference of the gantry 51. Each of the radiation detectors 1A is disposed such that the scintillator 2 is positioned on the center side of the gantry 51 and the photodetection unit 3A is positioned on the outside of the gantry 51.

The gantry 51 is provided with an opening portion for allowing a part or the whole of the body of a subject 100 (patient) lying on a bed or the like (not illustrated) to enter. The subject 100 is pre-administered with a radiopharmaceutical containing a positron emission nuclide. The radiation detector 1A detects pair annihilation gamma rays emitted from the subject 100.

By configuring the radiation detection device 50 using the radiation detector 1A having the structure described above, the radiation detection device 50 capable of exhibiting the effect of the radiation detector 1A described above can be obtained.

Modification Examples

Although several embodiments of the present disclosure have been described above, the present disclosure is not limited to the above embodiments. As the material and shape of each configuration, various materials and shapes not limited to those described above can be adopted.

For example, although the photodetection unit 3B is configured by an MCP-PMT in the second embodiment, the photodetection unit may be configured by an electron tube other than the above. In other words, the photodetection unit may be configured by a photomultiplier tube that is not an MCP-PMT or may be configured by a phototube (photoelectric conversion tube) that does not have an electron multiplier function.

In addition, although the filter layer 4 in the above embodiment (for example, the first embodiment) is configured to selectively block the scintillation light L1, which is larger in peak wavelength than the scintillation light L2, the scintillation light L2 smaller in peak wavelength may be selectively blocked in an alternative configuration. In this case, the photodetection unit 3A is capable of suitably detecting only the scintillation light L1 larger in peak wavelength. In addition, although the filter layer 4 in the above embodiment is configured to selectively block the scintillation light L1, which is longer in decay time than the scintillation light L2, the scintillation light L2 shorter in decay time may be selectively blocked in an alternative configuration. In this case, the photodetection unit 3A is capable of suitably detecting only the scintillation light L1 longer in decay time.

In addition, a part of the configuration in the above embodiment or modification example can be applied in any manner to the configuration in another embodiment or modification example. For example, in the radiation detector 1D of the fourth embodiment, the photodetection unit of another embodiment (for example, the photodetection unit 3B of the radiation detector 1B of the second embodiment) may be applied instead of the photodetection unit 3A.

What is claimed is:

1. A radiation detector comprising:
   a scintillator configured to generate first scintillation light having a first peak wavelength and second scintillation light having a second peak wavelength in response to radiation incidence;
   a photodetection unit configured to detect the scintillation light generated by the scintillator;
   a filter layer disposed between the scintillator and the photodetection unit and configured to selectively block the first scintillation light; and
   a second photodetection unit disposed on a side opposite to a side where the filter layer is provided with respect to the scintillator,
   wherein the filter layer has a metasurface structure,
   wherein the filter layer has a plurality of columnar metal structures arranged periodically,
   wherein both the first peak wavelength and the second peak wavelength are in a wavelength region of less than 350 nm, and
   wherein a period, a height, and a width of the plurality of columnar metal structures of the filter layer are set such that a reflectance for the first peak wavelength is at least 2.5 times a reflectance for the second peak wavelength.

2. The radiation detector according to claim 1, wherein the filter layer is a plasmonic filter using a surface plasmon.

3. The radiation detector according to claim 1, wherein the metal structure is configured by cylindrical aluminum.

4. The radiation detector according to claim 1, wherein the first scintillation light is longer in decay time than the second scintillation light.

5. The radiation detector according to claim 1,
wherein the scintillator has a first surface facing the photodetection unit and a second surface not facing the photodetection unit, and
wherein at least a part of the second surface is provided with a light absorption layer configured to absorb the first scintillation light reflected by the filter layer.

6. The radiation detector according to claim 1,
further comprising a second filter layer disposed between the scintillator and the second photodetection unit and configured to selectively block the second scintillation light.

7. The radiation detector according to claim 6,
wherein the second filter layer has a metasurface structure.

8. The radiation detector according to claim 7,
wherein the second filter layer is configured by a plurality of holes corresponding to the plurality of columnar metal structures of the filter layer.

9. The radiation detector according to claim 1,
wherein the photodetection unit is a solid-state image sensor or an electron tube.

10. The radiation detector according to claim 1,
wherein the radiation detector is an electron tube,
wherein the scintillator is a light incident window of the electron tube, and
wherein the photodetection unit is a photoelectric surface of the electron tube.

11. The radiation detector according to claim 10,
further comprising a protective film provided between the filter layer and the photodetection unit.

12. A radiation detection device comprising a gantry where a plurality of the radiation detectors according to claim 1 are arranged.

* * * * *